United States Patent

[11] 3,619,407

[72] Inventors Grant W. Hendricks
Brea;
Edward C. Attane, Orange; James W. Wilson, Brea, all of Calif.
[21] Appl. No. 885,896
[22] Filed Dec. 17, 1969
[45] Patented Nov. 9, 1971
[73] Assignee Union Oil Company of California
Los Angeles, Calif.

[54] HYDROCRACKING PROCESS WITH BENZCORONENES BLEEDSTREAM
9 Claims, 2 Drawing Figs.

[52] U.S. Cl. .................................................. 208/48 R,
203/4, 203/87, 208/111, 260/668 F, 260/674 R
[51] Int. Cl. ....................................................... C07c 15/00,
C10g 9/16, C10g 13/02
[50] Field of Search ........................................... 208/111, 48

[56] References Cited
UNITED STATES PATENTS
3,152,980 10/1964 Coonradt et al. ............... 208/78

| 3,215,013 | 10/1965 | Arey | 208/111 |
| 3,390,200 | 6/1968 | Sze | 260/672 |
| 3,485,883 | 12/1969 | Engelbrecht et al. | 260/672 |
| 3,505,208 | 4/1970 | Vaell | 208/111 |

Primary Examiner—Delbert E. Gantz
Assistant Examiner—G. E. Schmitkons
Attorneys—Milton W. Lee, Richard C. Hartman, Lannas S. Henderon, Dean Sandford and Robert E. Strauss ABSTRACT: Mineral oil feedstocks which contain dissolved benzcoronenes are subjected to recycle catalytic hydrocracking over crystalline zeolite-type catalysts while bleeding from the system a small proportion of a partial condensate from the hydrocracker, the volume of the withdrawn bleedstream being controlled so as to keep the concentration of benzcoronenes in the liquid product stream from building up to a level at which they will precipitate and "plate out" in the cooler parts of the system such as heat exchange surfaces. Novel means of controlling the bleed rate are also disclosed.

INVENTORS
GRANT W. HENDRICKS
EDWARD C. ATTANE
JAMES W. WILSON
BY
*James S. Henderson*
ATTORNEY

HYDROCRACKING PROCESS WITH BENZCORONENES BLEEDSTREAM

BACKGROUND AND SUMMARY OF THE INVENTION

The catalytic hydrocracking of mineral oil feedstocks to produce lower boiling hydrocarbons, using Group VIII metal-promoted crystalline zeolite catalysts at relatively low temperatures of about 500°–700° F., has in recent years become an established commercial process. This process offers substantial advantages over older hydrocracking processes in respect to catalyst life, liquid yields, reduced dry gas make, and lower operating temperatures and pressures. A difficulty has recently been encountered however in respect to the use of such zeolite catalysts for hydrocracking feedstocks containing dissolved benzcoronenes, and where a substantially total recycle of the unconverted oil is maintained. It will be understood that these benzcoronene contaminants are not native constituents of crude oils, or any of the virgin distillates therefrom. Neither are they found in detectable quantities in the unconverted oils from conventional catalytic cracking, coking, thermal cracking, or the like. They are soluble in hydrocarbon oils only to the extent of a few parts per million, up to perhaps about 100 parts per million of the more soluble species. The presently available evidence indicates that benzcoronenes find their way into refinery streams via synthesis in high-temperature hydroconversions such as reforming, or catalytic hydrofining at temperatures above about 700° F. As is well known, hydrocracking feedstocks are often subjected to catalytic hydrofining to reduce the sulfur and nitrogen levels to values which do not bring about undue deactivation rates of the hydrocracking catalyst. It is in respect to feedstocks which have been prehydrofined at relatively high temperatures that problems in respect to benzcoronenes have been encountered in zeolite hydrocracking processes.

The main problem is not, as might have been supposed, the tendency of the benzcoronenes to cause coking and deactivation of the catalyst; the relatively low temperatures and high hydrogen pressures employed tend to prevent further polymerization and/or condensation reactions of such compounds to form coke. Instead, the principal problem which has evolved is peculiar to those processes wherein unconverted oil is continuously recycled in the process. The small pore structure of the zeolite catalysts is apparently such that the benzcoronenes are not hydrogenated at a rate sufficient to prevent their buildup in the recycle system. Due to their relative insolubility in the oil, when the concentration of such compounds in the recycle oil builds up to a level of about 50–100 parts per million, they begin to "plate out" in cooler portions of the system, particularly heat exchange surfaces, transfer lines, valves and the like, resulting in plugging problems and reduced heat exchange efficiency.

This problem could of course be solved by subjecting the recycle oil, or a substantial portion thereof, to distillation or vacuum distillation (in the case of oils having an end boiling point above about 700° F.) to separate out a heavy bottoms fraction containing the benzcoronenes. This however leads to a substantial increase in capital costs, as well as increased operating expenses attendant upon the high heat load required to distill overhead about 90 to 99 percent of the recycle oil. Another solution to the problem, which avoids expensive distillation loads, resides in bleeding a portion of the recycle oil from the system and diverting it to other uses. This solution however is undesirable from several standpoints. Firstly, the size of the bleedstream must be substantial, at least during the terminal portion of a run, in order to keep the benzcoronene concentration throughout the system at sufficiently low levels as not to exceed solubility limits. This entails a substantially reduced yield of desired products such as gasoline. Secondly, since the concentration of benzcoronenes in a hydrofined feedstock generally increases substantially during a hydrocracking run (as a result of increasing severity in the hydrofiner), the size of the bleedstream required to maintain desired benzcoronene levels in the hydrocracking system will vary substantially over the run, entailing varying total feed rates to the reactor and resultant process control problems.

We have now discovered however that almost a total recycle of unconverted oil can be maintained indefinitely in such processes without encountering the above noted precipitation problems, and without increasing distillation loads, by simply withdrawing a small bleedstream of a benzcoronene-rich partial condensate of the reactor effluent. It is found that, due to their low vapor pressure, about 90–99 percent of the benzcoronenes in the reactor effluent can be trapped and collected in a liquid condensate which may amount to no more than about 0.5–10 volume-percent of the total normally liquid hydrocarbons in the effluent. Since the concentration of benzcoronenes in this partial condensate is much greater, e.g., five to 10 times the concentration which would prevail in the recycle oil, it will be apparent that a much smaller bleedstream of the former than of the latter will be needed to remove from the system the same amount of benzcoronenes.

Another novel feature of our process resides in the control means utilized for regulating the rate of withdrawal of the partial condensate bleedstream. It is of course well known in the art of recycle catalytic conversion processes to bleed off a portion of the recycle stream in order to prevent catalyst fouling due to the buildup in the system of coke precursors, poisons and the like. The rate of withdrawal of such conventional bleedstreams is therefore made responsive to catalyst deactivation rates. But as indicated above, under hydrocracking conditions utilizing crystalline zeolite catalysts, the benzcoronenes do not appear to be coke precursors or catalyst poisons to any substantial degree, at least until they exceed concentration levels at which the precipitation and plating out problems noted above become a limiting factor. We therefore control the bleed rate in response to the primary variable of benzcoronene concentration in the liquid product condensate, so as to maintain it at below the level at which precipitation will occur in the coolest parts of the system, normally the terminal portion of the heat exchange train. As will be explained in more detail hereinafter, this may be accomplished by means of a motor valve on the bleed line operated in response to some means for detecting, directly or indirectly, the threshold concentration of benzcoronenes at which incipient precipitation will occur in the coolest parts of the product recovery system.

DESCRIPTION OF FEEDSTOCKS

Figure 1:
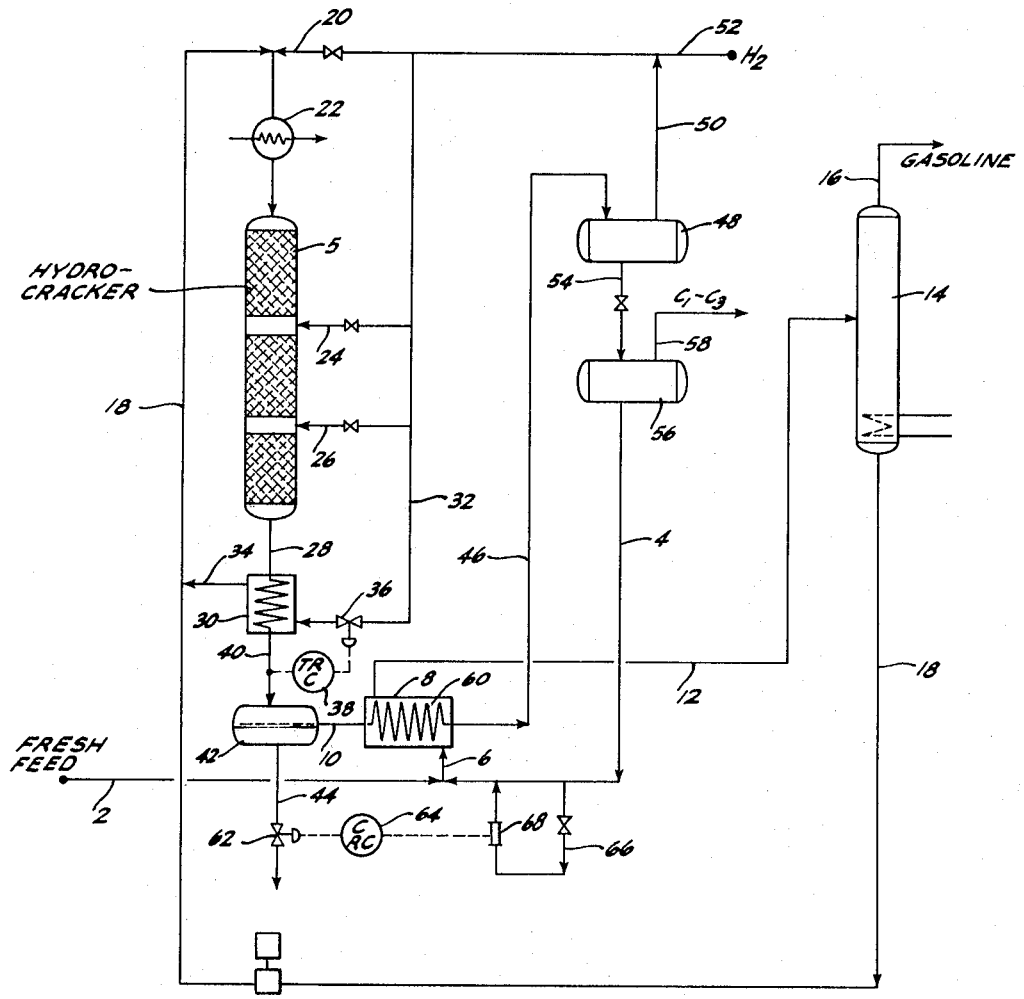
FIG. 1 is a simplified flow diagram illustrating an application of the invention to a specific process arrangement to be described hereinafter.

Broadly speaking, any mineral oil feedstock may be employed herein which contains benzcoronenes in an amount sufficient to result in a buildup thereof to levels above their solubility limit in a recycle hydrocracking process utilizing the crystalline zeolite catalyst to be described hereinafter. In some cases, amounts as low as one weight-part-per-million may be sufficient to result in such undesirable buildup, although in general amounts greater than about 5 parts per million are required. It is noteworthy that coronene itself, either because of greater solubility and/or greater ease of conversion by the zeolite catalyst, does not appear to be troublesome. The troublesome benzcoronenes are defined herein as any fused-ring polycyclic aromatic hydrocarbon containing a coronene nucleus and fused thereto at least one additional benzo-ring. Examples of such compounds which have been found in solid deposits removed from heat exchangers are as follows:

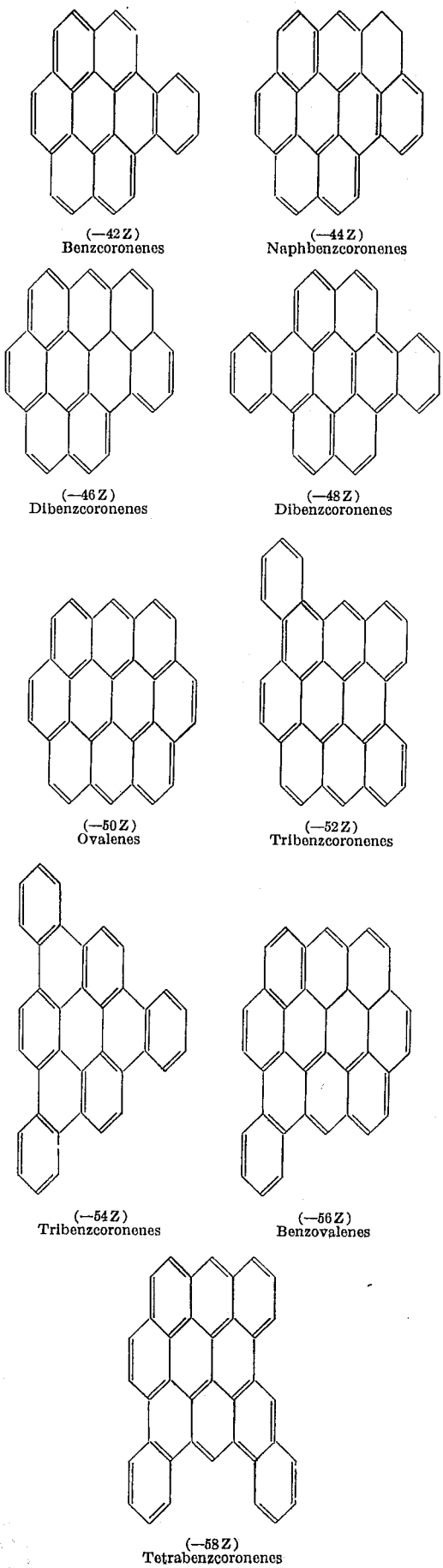

It will be apparent that in many instances, the above structural formulas represent merely one isomer of the given generic name. The "Z" factors noted refer to the hydrogen deficiency of the respective hydrocarbons, from the general formula, $C_nH_{2n+}$.

Although the above compounds are very high boiling materials it is not to be assumed that they are found only in mineral oils of similarly high end boiling points (as determined by conventional ASTM methods). Since the limit of solubility of these compounds ranges between about 10 and 100 parts per million, their presence in mineral oils has little or no effect upon end boiling points as determined by conventional methods. Hence, it may be found that feedstocks with end boiling points as low as about 500° F. may contain troublesome amounts of benzcoronenes.

As noted above, benzcoronenes are generally found only in hydrocarbon fractions which have previously been subjected to high-temperature hydrocatalytic conversions such as catalytic reforming or catalytic hydrofining. Products from these refining processes hence normally constitute the primary feedstocks to which the present invention is applicable. Typical feedstocks comprise hydrofined gas oils boiling between about 400° and 1000° F., heavy naphtha reformate polymer fractions boiling between about 400° and 550° F., and the like. Obviously, blends of such fractions with other virgin and/or cracked distillates may also be utilized.

The hydrofining operations which are most likely to bring about synthesis of benzcoronenes in undesirable amounts are those which are carried out at temperatures above about 700° F. and pressures below about 2,000 p.s.i.g. However, in some instances undesirable quantities may be found in oils hydrofined at lower temperatures and/or higher pressures. The nature of the hydrofining catalyst is also a contributing factor, their hydrogenation and cracking activities being relatively low. Typical hydrofining catalysts include for example the oxides and/or sulfides of molybdenum and/or tungsten, preferably composited with an iron group metal oxide and/or sulfide such as nickel or cobalt. Ordinarily these hydrogenating components are supported on a relatively noncracking carrier such as activated alumina, or any other difficultly reducible refractory oxide having a Cat-A Activity Index below about 25. Typically, the benzcoronene content of the effluent from such hydrofining systems may range between about 3 and 50 p.p.m. for feedstocks which originally contained less than 1 p.p.m.

DETAILED PROCESS DESCRIPTION

Reference is now made to the accompanying drawings for a more detailed description and illustration of the invention. In FIG. 1, fresh feed is introduced via line 2. This illustrative feedstock consists of total product condensate from a previous hydrofining-hydrocracking stage not shown, and thus consists of unconverted gas oil and product gasoline from the first stage. It is desired to fractionate out the gasoline from this first-stage condensate in a single fractionating column which is also used for recovering the gasoline product from second-stage hydrocracker 5. To accomplish this, the fresh feed in line 2 is blended with total degassed product condensate from line 4 and passed via line 6 through heat exchanger 8 in heat exchange relationship to partially condensed, high-pressure effluent from second-stage hydrocracker 5 which passes through heat exchanger 8 via line 10. Heat exchanger 8 thus transfers heat from the partially condensed, high-pressure effluent from hydrocracker 5 to the combined fresh feed from line 2 and the total degassed condensate from hydrocracker 5. The resulting preheated feed and product stream is transferred via line 12 to fractionating column 14. In column 14 combined product gasoline from hydrocracker 5 and from the fresh feed entering via line 2 is recovered overhead via line 16, while a bottoms fraction comprising fresh feed gas oil from line 2 and unconverted oil from hydrocracker 5 is recovered via line 18.

The bottoms fraction in line 18 is blended with recycle and makeup hydrogen from line 20 and passed via fired preheater 22 into the top of hydrocracker 5, packed with one or more beds of zeolite hydrocracking catalyst to be described hereinafter. Suitable hydrocracking conditions for hydrocracker 5 may vary within the following ranges:

HYDROCRACKING CONDITIONS

|  | Broad Range | Preferred Range |
| --- | --- | --- |
| Temp., °F. | 450–850 | 500–750 |
| Pressure, p.s.i.g. | 500–4000 | 1000–3000 |
| LHSV | 0.4–20 | 1–10 |
| H$_2$/Oil Ratio, MSCF/B | 3–15 | 4–10 |

In order to control temperatures in hydrocracker 5 within the specified ranges, one or more streams of cool quench hydrogen may be introduced at various levels therein as illustrated via lines 24 and 26. It will be understood that at the beginning of a hydrocracking run with a fresh, highly active catalyst, relatively low temperatures will be maintained in hydrocracker 5, while later in the run as the catalyst deactivates, temperatures are raised incrementally to maintain the desired conversion level.

Effluent from hydrocracker 5 is withdrawn via line 28 and passed through heat exchanger 30 wherein partial condensation is effected by heat exchange against cold recycle hydrogen from line 32. The resulting preheated hydrogen stream is withdrawn via line 34 and blended with reactor feed in line 18. The degree of cooling effected in exchanger 30 is regulated by motor valve 36 operated by temperature recorder controller 38, so as to maintain a predetermined constant temperature of the partial condensate effluent from exchanger 30 in line 40. Those skilled in the art will understand that this predetermined temperature will depend upon a number of factors, principally the degree of partial condensation desired, the boiling range of the feedstock, pressure and hydrogen/oil ratio. It is normally desirable to condense about 0.5–15 volume-percent of the total normally liquid hydrocarbons in the reactor effluent, preferably about 1–10 volume-percent. Usually the desired degree of partial condensation is obtained within a temperature range of about 400°–550° F. In some cases, particularly at the beginning of a run, the reactor effluent in line 28 may be at or below the predetermined partial condensation temperature. In these cases, temperature recorder controller 38 will merely operate to close valve 36, further condensation being unnecessary at this point.

Partially condensed reactor effluent in line 40 is transferred to a knockout pot or separator vessel 42, in which sufficient liquid condensate is trapped to permit the desired bleedstream to be withdrawn via line 44. Uncondensed effluent plus excess liquid condensate flows from separator 42 via line 10 through final heat exchanger 8 in which condensation is completed by cooling the effluent to e.g., about 100°–150° F. The cooled effluent from exchanger 8 is passed via line 46 to high-pressure separator 48, from which recycle hydrogen is withdrawn via line 50 to be recycled in admixture with fresh makeup hydrogen from line 52 to hydrocracker 5 as previously described. High-pressure condensate in separator 48 is flashed via line 54 into low-pressure separator 56, from which light flash gases such as methane, ethane and propane are exhausted via line 58. The cool low-pressure condensate in separator 56 is then transferred via lines 4 and 6 to heat exchanger 8 to serve as the heat exchange medium therein as previously described.

In the above described system, the most critical zone of benzcoronene precipitation and "plating-out" is found near the cooler end of exchanger 8, specifically in the section of exchanger tubing 60 nearest effluent outlet line 46, as well as in line 46 itself. To guard against precipitation of benzcoronenes in these zones, it is necessary to regulate the rate of withdrawal of partial condensate bleedstream in line 44 so as to keep the concentration of benzcoronenes in the liquid condensate in line 46 below the limit of their solubility therein at the temperature prevailing in line 46. A convenient but indirect method of regulating this bleedstream withdrawal is illustrated in FIG. 1. According to this method a motor valve 62 in line 44 is operated in response to a colorimeter recorder controller 64, which continuously or intermittently detects the intensity of color of a slipstream of reactor condensate from line 4, which is diverted via line 66 and sight glass 68. The benzcoronenes are bright orange in color, and a fairly accurate approximation of their concentration in hydrocarbon solutions can be obtained colorimetrically. Hence, by predetermining the solubility limits of benzcoronenes in the liquid condensate in line 46, and correlating this with color of the condensate in line 4, colorimeter recorder controller 64 can be calibrated so as to open motor valve 62 and bleed more partial condensate out line 44 whenever the color of the condensate indicates that benzcoronene solubility limits are about to be exceeded in line 46.

Figure 2:
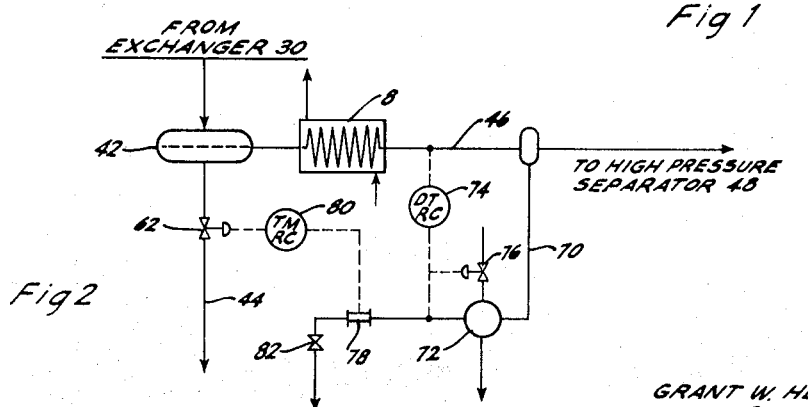
FIG. 2 is a flow diagram illustrating an alternative control system for regulating the withdrawal of the bleedstream from partial condensate receiver 42 of FIG. 1.

FIG. 2 illustrates an alternative mode of controlling bleedstream 44 which, though somewhat more complex than the system of FIG. 1, is more directly responsive to benzcoronene concentration in the condensate from exchanger 8. According to this modification a small analytical bleedstream is withdrawn continuously or intermittently from line 46 via line 70 and passed through a cooler 72 in which it is cooled to a predetermined temperature below the temperature prevailing in line 46. Control over the degree of cooling is provided by differential temperature recorder controller 74 which operates motor valve 76 to regulate the supply of coolant to cooler 72. The object of this arrangement is to be able to detect incipient precipitation of benzcoronenes in line 46 before actual precipitation occurs therein. Depending upon the margin of safety desired, the bleedstream in line 70 will be cooled to a temperature of e.g., about 10° to 50° F. below the temperature prevailing in line 46. The resulting cooled bleedstream is monitored via sight glass 78 by turbidometer recorder controller 80, which in turn operates motor valve 62 in bleedstream line 44. When a predetermined degree of turbidity is detected, turbidometer recorder controller 80 opens valve 62 to bleed more partial condensate from the system, thus decreasing the concentration of benzcoronenes in the total condensate in line 46. It is important in this control system that solubility be determined at the system pressure prevailing in line 46, because the hydrogen and light hydrocarbon gases dissolved in the liquid phase have a definite precipitating effect on benzcoronenes. Hence the bleedstream in line 70 is maintained at the system pressure by means of valve 82.

By properly calibrating either of the above-described control systems, the concentration of benzcoronenes in the liquid condensate from exchanger 8 can be maintained at a safe level of e.g., about 2 to 50 percent, preferably 5 to 25 percent, below the limit of their solubility therein. By operating within these limits, the fouling of heat exchange surfaces is safely avoided, while at the same time the volume of the bleedstream in line 44 is minimized. Obviously, many other control systems could be devised to achieve the same essential objective.

As noted above, it is in heat exchanger 8 that the major problem is encountered of the "plating out" of condensed benzcoronene in the exchanger tubing. In the past, when operating such systems without a bleedstream, frequent shutdowns were necessary to remove such deposits from the heat exchangers. A typical analysis of such removed material (by low voltage, direct probe sampling, high resolution mass spectrometry) was reported as follows:

TABLE 1

| Compound type | Z No. | Weight-percent of methyl homologs number of methyl groups | | | | | | Total |
|---|---|---|---|---|---|---|---|---|
| | | 0 | 1 | 2 | 3 | 4 | 5 | |
| Coronenes | −36 | 0.0 | 0.1 | 0.1 | 0.2 | 0.1 | 0.0 | 0.5 |
| Benzcoronenes | −42 | 1.1 | 6.3 | 6.9 | 3.2 | 0.7 | 0.2 | 18.4 |
| Naphbenzcoronenes | −44 | 0.1 | 1.1 | 2.4 | 1.3 | 0.3 | 0.0 | 5.2 |
| Dibenzcoronenes | −46 | 0.2 | 1.2 | 2.2 | 1.8 | 0.7 | 0.3 | 6.4 |
| Dibenzcoronenes | −48 | 0.2 | 0.6 | 1.3 | 1.2 | 0.4 | 0.1 | 3.8 |
| Ovalenes | −50 | 0.3 | 0.7 | 3.2 | 3.2 | 1.9 | 0.6 | 9.9 |
| Tribenzcorones | −52 | 0.5 | 13.5 | 10.6 | 4.5 | 1.3 | 0.4 | 38.9 |
| Tribenzcoronenes | −54 | 0.3 | 1.6 | 1.9 | 0.8 | 0.3 | 0.0 | 4.9 |
| Benzovalenes | −56 | 1.6 | 2.4 | 1.8 | 0.7 | 0.2 | 0.0 | 6.7 |
| Tetrabenzocoronenes | −58 | 3.8 | 0.1 | 0.1 | 0.2 | 0.2 | 0.0 | 4.4 |
| | | | | | | | | 100.0 |

DESCRIPTION OF HYDROCRACKING CATALYSTS

Operative catalysts for use herein comprise in general any crystalline zeolite cracking base upon which is deposited a minor proportion of a Group VIII metal hydrogenating component. The zeolite cracking bases are sometimes referred to in the art as molecular sieves, and are composed usually of silica, alumina and one or more exchangeable cations such as sodium, hydrogen, magnesium, calcium, rare earth metals, etc. They are further characterized by crystal pores of relatively uniform diameter between about 4 and 14 A. It is preferred to employ zeolites having a relatively high $SiO_2/Al_2O_3$ mole-ratio, between about 3 and 12, and even more preferably between about 4 and 8. Suitable zeolites found in nature include for example mordenite, stilbite, heulandite, ferrierite, dachiardite, chabazite, erionite, and faujasite. Suitable synthetic zeolites include for examples those of the "B," "X," "Y" and "L" crystal types, or synthetic forms of the natural zeolites noted above, e.g., synthetic mordenite. The preferred zeolites are those having crystal pore diameters between about 8–12 A., wherein the $SiO_2/Al_2O_3$ mole-ratio is about 4 to 6. A prime example of a zeolite falling in this preferred group is synthetic Y molecular sieve.

The naturally occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged out with a polyvalent metal, and/or with an ammonium salt followed by heating to decompose the zeolitic ammonium ions, leaving in their place hydrogen ions and/or exchange sites which have actually been decationized by further removal of water:

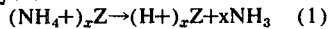

$(NH_4^+)_xZ \rightarrow (H^+)_xZ + xNH_3$    (1)

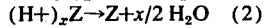

$(H^+)_xZ \rightarrow Z + x/2\ H_2O$    (2)

Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially backexchanging with a polyvalent metal salt and then calcining. In some cases, as in the case of synthetic mordenite, the hydrogen forms can be prepared by direct acid treatment of the alkali metal zeolites. The preferred cracking bases are those which are at least about 10 percent, and preferably at least 20 percent, metal-cation-deficient, based on the initial ion-exchange capacity. A specifically desirable and stable class of zeolites are those wherein at least about 20 percent of the ion-exchange capacity is satisfied by hydrogen ions, and at least about 10 percent by polyvalent metal ions such as magnesium, calcium, zinc, rare earth metals, etc.

The essential active metals employed herein as hydrogenation components are those of Group VIII, i.e., iron, cobalt, nickel, ruthenium, rhodium, palladium, osmium, iridium, and platinum. The noble metals are preferred and particularly palladium and platinum. In addition to these metals, other promoters may also be employed in conjunction therewith, including the metals of Group VIB and Group VIIB, e.g., molybdenum, tungsten, manganese, etc.

The amount of hydrogenating metal in the catalyst can vary within wide ranges. Broadly speaking, any amount between about 0.05 percent and 30 percent by weight may be used. In the case of the noble metals, it is normally preferred to use about 0.05 percent to 2 percent. The preferred method of adding the hydrogenating metal is by ion exchange. This is accomplished by digesting the zeolite, preferably in its ammonium form, with an aqueous solution of a suitable compound of the desired metal wherein the metal is present in a cationic form, as described for example in U.S. Pat. No. 3,236,762.

Following addition of the hydrogenating metal, the resulting catalyst powder is then filtered off, dried, pelleted with added lubricants, binders or the like if desired, and calcined in air at temperatures of, e.g., 700°–1,200° F. in order to activate the catalyst and decompose zeolitic ammonium ions. Alternatively, the zeolite component may first be pelleted, followed by addition of the hydrogenating component and activation by calcining.

The foregoing catalysts may be employed in undiluted form, or the powdered zeolite catalyst may be mixed and copelleted with other relatively less active catalysts, adjuvants, diluents or binders such as activated alumina, silica gel, coprecipitated silica-alumina cogels, magnesia, activated clays and the like in proportions ranging between about 5 and 90 percent by weight. These adjuvants may be employed as such, or they may contain a minor proportion of an added hydrogenating metal, e.g., a Group VIB and/or Group VIII metal.

The following example is cited to illustrate the invention more specifically, but is not to be construed as limiting in scope.

EXAMPLE

In a recycle hydrocracking operation utilizing a hydrofined 850° F. end-point gas oil feedstock essentially free of sulfur and nitrogen and containing 10 p.p.m. of benzcoronenes, and employing as the catalyst a copelleted composite of 80 weight-percent of a magnesium-hydrogen-Y zeolite (3 wt.-percent MgO) and 20 weight-percent of an activated alumina binder, the composite being promoted with an added 0.5 weight-percent of Pd, the principal operating conditions are as follows:

| Temperature, °F. | 670–680 |
|---|---|
| Pressure, p.s.i.g. | 1650 |
| LHSV | 1.5 |
| $H_2$/Oil Ratio, MSCF/B | 7 |

The catalyst bed temperature is adjusted within the above range to maintain a constant 50 volume-percent conversion per pass to 400° F. end point gasoline, with all of the unconverted oil being initially recycled until the benzcoronene content of the recycle oil reaches about 100 p.p.m. (about 50 p.p.m. in the total reactor condensate). To continue operation with a recycle oil bleed to prevent further increase in the benzcoronene concentration of the reactor condensate requires that about 10.5 percent of the recycle oil be bled from the system. In a 10,000 B/D unit, this means that about 1,000 B/D must be removed and diverted to less profitable uses.

To modify the above operation in accordance with the present invention, the reactor effluent is precooled to 520° F. to thereby obtain a partial condensate amounting to about 5 volume-percent of the total normally liquid hydrocarbon effluent. This partial condensate contains about 95 percent of the total benzcoronene content of the reactor effluent. An 11 percent bleed of this partial condensate stream is sufficient to maintain a constant 50 p.p.m. of benzcoronenes in the total reactor condensate. But since the partial condensate amounts to only about one-tenth the volume of the recycle oil, the total volume of the bleed stream is only 11 percent of the volume of recycle oil bleed required to maintain the same benzcoronene concentration in the reactor condensate. In a 10,000 B/D unit, the partial condensate bleed stream is only 110 B/D. A small bleed of this magnitude can be diverted to other uses without serious economic loss.

Additional modifications and improvements utilizing the discoveries of the present invention can readily be anticipated by those skilled in the art from the foregoing disclosure, and such modifications and improvements are intended to be included within the scope and purview of the invention as defined in the following claims:

We claim:

1. In a catalytic hydrocracking process wherein a mineral oil feedstock containing dissolved benzcoronenes is subjected to hydrocracking with added hydrogen over a Group VIII metal-promoted crystalline zeolite hydrocracking catalyst at elevated temperatures and pressures sufficient to give a substantial conversion to lower boiling products, and wherein effluent from the hydrocracking zone is passed through a heat exchange system to effect condensation of liquid product and unconverted oil, and wherein sufficient of said unconverted oil is recycled to the hydrocracking zone to bring about a buildup in the system of benzcoronenes to a concentration normally exceeding the limit of their solubility in the condensed liquid product at the coolest portion of said heat exchange system, the improved method for maintaining said benzcoronene concentration at a level below said solubility limit, which comprises:

1. partially cooling effluent from said hydrocracking zone to effect condensation of a minor proportion of the normally liquid hydrocarbons therein, thereby forming a benzcoronene-rich partial condensate;
   2. withdrawing from the system a bleedstream of said partial condensate; and
   3. controlling the rate of withdrawal of said bleedstream in response to analytical detection means for determining benzcoronene concentration in the liquid condensate at said coolest portion of said heat exchange system, so as to maintain in said coolest portion a concentration of benzcoronenes which is (a) below the level at which precipitation thereof in the liquid condensate would occur, and (b) greater than about one-half the concentration thereof at which precipitation would occur.

2. A process as defined in claim 1 wherein said withdrawal of partial condensate bleedstream is controlled by a motor valve operated by a colorimeter recorder controller calibrated to respond to color variations detected downstreamwardly in the liquid condensate from said heat exchange system.

3. A process as defined in claim 1 wherein said withdrawal of partial condensate bleedstream is controlled by a motor valve operated by a turbidometer recorder controller calibrated to respond to turbidity detected in a sample of condensate from said heat exchange system, said turbidity being detected after cooling said sample to a temperature below the lowest temperature prevailing in said heat exchange system.

4. A process as defined in claim 1 wherein said controlling in step (3) is calibrated so as to maintain a concentration of benzcoronenes in said coolest portion which is between about 5 percent and 25 percent below the limit of their solubility in the liquid condensate from said heat exchange system.

5. A process as defined in claim 1 wherein said cooling in step (1) is controlled to yield a partial condensate amounting to about 0.5 to 15 percent by volume of the total normally liquid hydrocarbons contained in said hydrocracker effluent.

6. A process as defined in claim 1 wherein said feedstock is a hydrofined gas oil containing about 3 to 50 p.p.m. of benzcoronenes.

7. A process as defined in claim 1 wherein said hydrocracking catalyst is a Group VIII noble metal-promoted Y zeolite wherein the zeolitic cations are mainly hydrogen ions and/or polyvalent metal ions.

8. A process as defined in claim 1 wherein said controlling step (3) is calibrated so as to maintain a concentration of benzcoronenes in said coolest portion which is between about 5 and 25 percent below the limit of their solubility in the liquid condensate from said heat exchange system, and wherein cooling in step (1) is controlled to yield a partial condensate amounting to about 0.5 to 15 percent by volume of the total normally liquid hydrocarbons contained in said hydrocracker effluent.

9. A process as defined in claim 8 wherein said feedstock is a hydrofined gas oil containing about 3 to 50 p.p.m. of benzcoronenes, and wherein said hydrocracking catalyst is a Group VIII noble metal-promoted Y zeolite wherein the zeolitic cations are mainly hydrogen ions and/or polyvalent metal ions.

* * * * *